United States Patent
Scheidling et al.

(10) Patent No.: US 6,540,427 B2
(45) Date of Patent: *Apr. 1, 2003

(54) CONNECTION ELEMENT FOR CABLE PULLS

(75) Inventors: Matthias Scheidling, Frieberg (DE); Grant A. Webb, Howell, MI (US); Arnd Bürger, Einbeck (DE)

(73) Assignee: United Parts FHS Automobil Systeme GmbH, Dassel (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,230

(22) Filed: Oct. 12, 1999

(65) Prior Publication Data

US 2002/0182001 A1 Dec. 5, 2002

(30) Foreign Application Priority Data

Oct. 12, 1998 (DE) .......................... 198 46 738

(51) Int. Cl.⁷ ................ F16C 1/26; F16L 5/02
(52) U.S. Cl. ............. 403/269; 403/265; 403/187; 403/188; 74/502.5; 74/502.6
(58) Field of Search .............. 403/280, 248, 403/265, 266, 267, 274, 278, 282, 269, 187, 188; 74/502.5, 502.6; F16C 1/26; F16L 5/02

(56) References Cited

U.S. PATENT DOCUMENTS 4,541,303 A * 9/1985 Kuzunishi
6,270,126 B1 * 8/2001 Juedes .................. 285/246

FOREIGN PATENT DOCUMENTS

| DE | 3737345 | * | 5/1989 |
| EP | 0703395 | * | 8/1995 |
| EP | 703 395 A1 | | 3/1996 |
| EP | 0790418 | * | 2/1997 |
| EP | 790 418 A1 | | 8/1997 |
| GB | 2156027 | * | 10/1985 |
| JP | 59-16727 | * | 1/1984 |
| WO | WO-98/23874 | * | 6/1998 |
| WO | WO-98/23875 | * | 6/1998 |

* cited by examiner

Primary Examiner—Lynne H. Browne
Assistant Examiner—Ernesto Garcia
(74) Attorney, Agent, or Firm—Cohen, Pontani, Lieberman & Pavane

(57) ABSTRACT

A connection element for cable pulls, having a cable pull sleeve for protecting the cable pull core and for the transmission of movements with forces, an elongated wire for mechanical strength of the cable, a guide tube for guiding the inner cable core, and rubber elements for damping. Elongated wires having bent ends are provided with an injection molding so that there is a contour with U-shaped cross section in the injection molding. A holder engages in the injection molding via an elastic element which simultaneously carries the guide tube and connects it with the injection molding. A flat strip with sliding tube opens into the guide tube.

6 Claims, 2 Drawing Sheets

CONNECTION ELEMENT FOR CABLE PULLS

BACKGROUND OF THE INVENTION

1. Field of the Invention

The invention is directed to a connection element for cable pulls.

2. Discussion of the Prior Art

The invention can be applied wherever cable pulls are to be connected, preferably for motor vehicles in which a cable pull core moves with parts of the motor vehicle.

The invention offers the advantage that this connection can be carried out with few structural component parts, wherein the connection element can be manufactured quickly and precisely, complicated assembly is done away with, and the inner core is guided in an exact manner. The connection element ensures a construction which is free of play and guarantees complete decoupling from the holder with little effort.

Quick fasteners are known from the prior art for connecting cable pulls of motor vehicles with holders. For instance, European reference EP 0703395 A1 describes a fastening system which makes it possible to connect the cable pull core with a holder by means of different mechanical parts which are movable relative to one another. This type of solution requires a large number of mechanical parts which must be connected with one another and which, because of their rigidity, transmit noise and vibrations of the cable pulls to the vehicle. Installation of the latter requires tolerances which must be adhered to, which increases the cost of manufacturing. Further, these quick fasteners must be fit to different cable pulls; this is also true for the holders. This solution does not enable a versatility of different cable pull sleeves relative to one another.

In order to connect different cable pull sleeves with one another in a flexible manner, it is disclosed, for example, in European reference EP 0790418 A1, to connect different cable pull sleeves with one another, wherein the sleeves can be inserted simultaneously in a holder. This solution also has a large number of parts which, by their nature, transmit vibrations and noise and wear out. The parts which can be joined one inside the other must be manufactured very precisely, which generates high production costs. Assembly of these parts represents an additional expenditure. Due to the fact that this solution is exposed to continuous vibrations of the cable pull core and housing, the wear that occurs requires that these parts be replaced. Due to the large number of parts, the assembly and the aforementioned manufacture, connecting or joining elements of the type mentioned above are not economical to manufacture. They also do not allow a variable use of different cable pull sleeves with determined holders.

SUMMARY OF THE INVENTION

Therefore, it is an object of the present invention to overcome the disadvantages of the prior art and to provide a connection element which connects cable pull sleeves with one another with a holder in a simple manner and economically with respect to manufacturing and assembly.

The solution according to the invention provides a connection element that includes an injection molding which forms a U-shaped contour in cross section which sheathes a cable pull sleeve and an elongated wire located therein, as well as the flat strip with a sliding tube located on the inside. The bent elongated wires are enclosed in the first U-leg of the injection molding through which the flat strip with sliding tube, in which the cable pull core is located, is guided. The contour of the injection molding which is U-shaped in cross section has a spacing between the U-legs which is greater than the holder in which the connection element is to be fastened.

It is essential that the sliding tube with the flat strip projects out of the end of the injection molding substantially so that a guide tube can be fastened over the flat strip with the sliding tube from the other side. The guide tube and the injection molding are advantageously produced one after the other or simultaneously from a plastic in a corresponding device. Appropriate processes for producing elements of this kind are known to those skilled in the art. Accordingly, the guide tube and the injection molding and the flat strip with the sliding tube and the bent elongated wire and the cable pull sleeve can be produced quickly and simply.

The elastic element, which can be rubber or elastomer is then arranged around the guide tube and the injection molding in a further work step so that it can be inserted into a recess around the holder. In this respect, it must be ensured during manufacture that a fixed contacting connection, for example, a press fit, exists between the elastic element and a holder which is formed by clipping the elastic element into the holder. It is essential to the invention that the elastic element has a taper in the direction of the guide tube. This taper can extent in a straight line and should advantageously have an angle creating a stable connection between the guide tube and the elastic element depending on the material used.

Further, it is advantageous that a supporting element and/or a holding element is arranged around the elastic element. For example, this can be a metal sheathing which is arranged around the elastic element in the form of a press fit. This supporting or holding element serves in particular to provide protection against wear in the case of soft rubber elements. This supporting or holding element can be arranged on the rubber element in the direction of the guide tube as well as in the direction of the injection molding. This supporting and holding element is advantageously glued to the elastic element.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENT EMBODIMENTS

Figure 1:
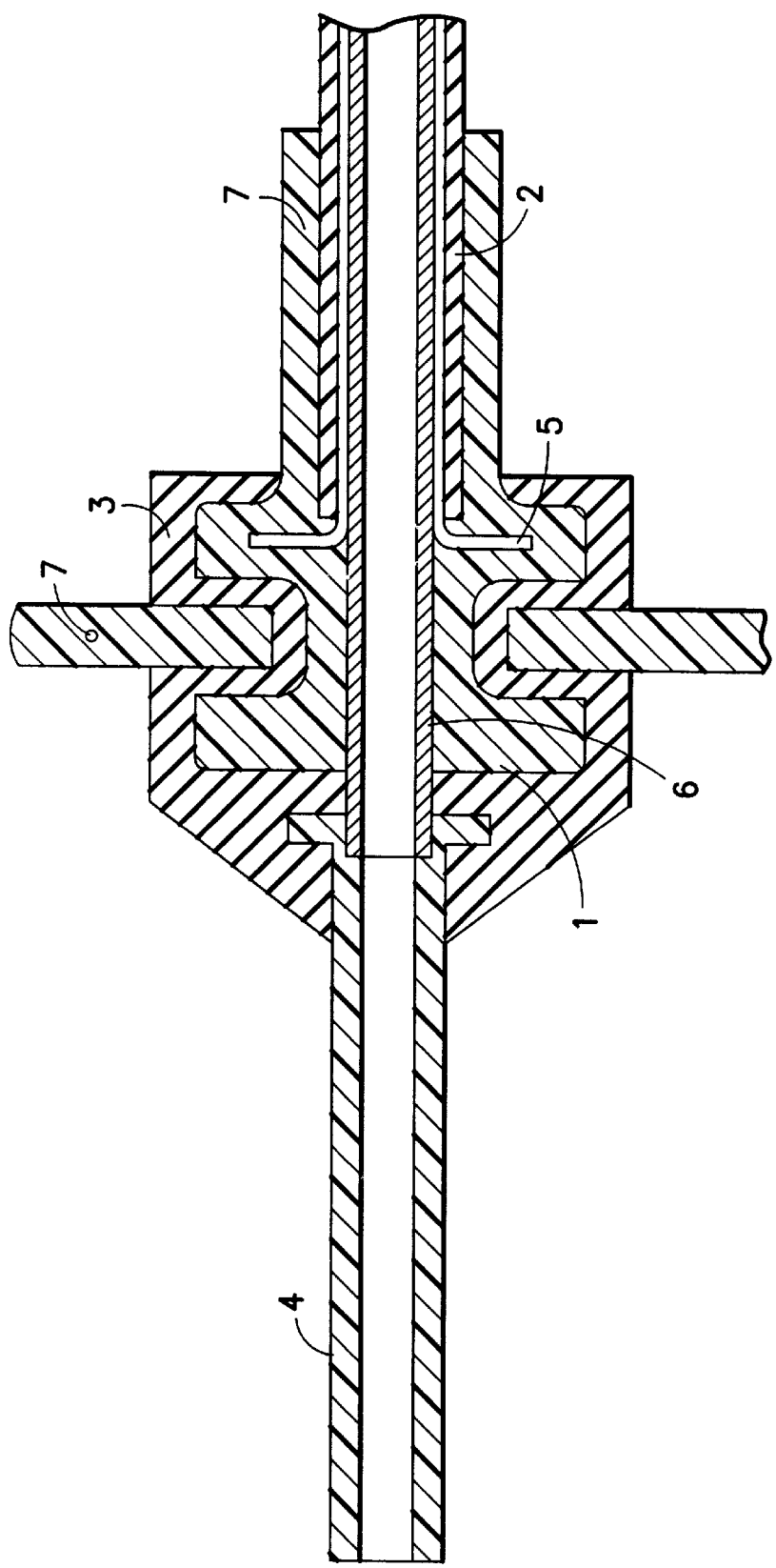
FIG. 1 is a sectional view of a connection element for cable pulls pursuant to the present invention.

FIG. 1 shows the connection element, according to the invention, for cable pulls which has been inserted into a holder 7 with a rubber element 3. The rubber element 3 protectively encloses an injection molded part 1 and a guide tube 4 which projects out of the rubber element 3 at a pointed side. However, the injection molding 1 and the guide tube 4 are also connected with one another by a sliding tube 6 with a flat strip. The flat strip with sliding tube 6 in which the cable pull core, not shown, is located is surrounded by an elongated wire 5 which is bent at its ends and is accordingly fixedly anchored in a radially directed U-shaped portion of the injection molding 1. The elongated wire 5 is enclosed by a cable pull sleeve 2.

Figure 2:
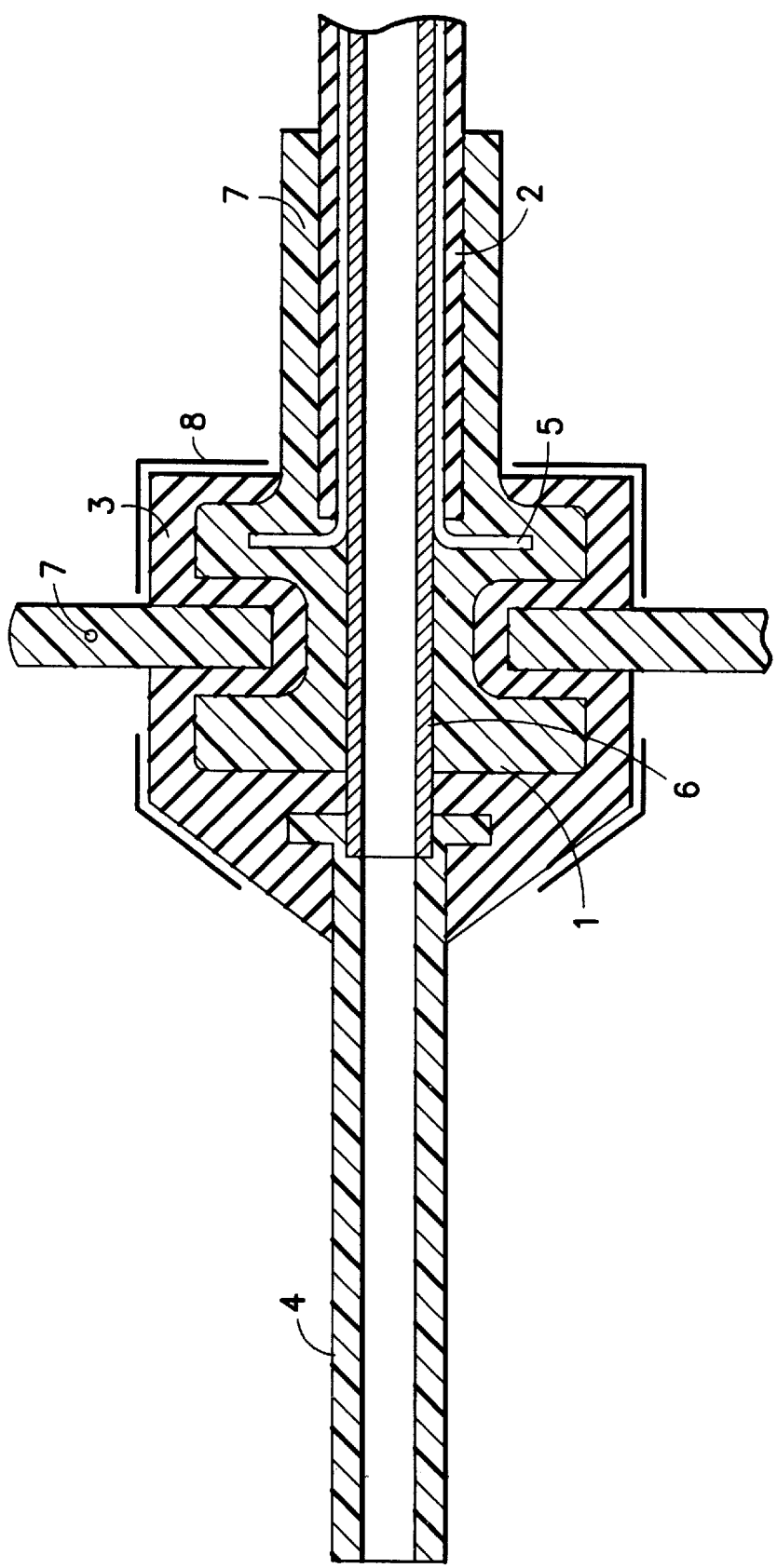
FIG. 2 is a view similar to FIG. 1 of a connection element for cable pulls with supporting and holding elements.

FIG. 2 shows an embodiment in which the rubber element 3 is enclosed by supporting and holding elements 8. The construction according to the invention has the advantage that it provides a connection element which has only a few structural component parts and which can be manufactured quickly and precisely, wherein a complicated assembly is done away with and an exact guiding of the inner core is provided.

The invention is not limited by the embodiments described above which are presented as examples only but can be modified in various ways within the scope of protection defined by the appended patent claims.

We claim:

1. A connection element for a cable pull having a core, comprising:

an injection molded part having a radially directed portion with a U-shaped cross section that extends transverse to a longitudinal axis of the connection element;

elongated wires having bent ends mounted in the injection molded part in a form-locking manner;

an elastic element arranged to completely surround the U-shaped cross section of the injection molded part;

a holder arranged to engage in the U-shaped cross section of the injection molded part via the elastic element;

a guide tube having one end mounted in the elastic element, the wires being surrounded by the guide tube;

a cable pull sleeve arranged in the injection molding part; and a sliding tube arranged in the cable pull sleeve so as to extend through the injection molded part and open into the guide tube, and so as to be surrounded by the elongated wires.

2. The connection element according to claim 1, wherein the elastic element is a rubber element.

3. The connection element according to claim 1, wherein the elastic element is made of an elastomer.

4. The connection element according to claim 1, and further comprising a supporting and holding element arranged around the elastic element.

5. The connection element according to claim 1, wherein the elastic element is formed with an acute angle at a side facing the guide tube.

6. The connection element according to claim 1, wherein the elongated wires are arranged to open into a leg of the U-shaped cross section of the injection molding part so as to be extensively uniformly enclosed by the injection molding.

* * * * *